United States Patent [19]

Bertram

[11] Patent Number: 4,914,911
[45] Date of Patent: Apr. 10, 1990

[54] MARINE ENGINE EXHAUST SYSTEM WITH DIVERTER VALVE AND ALTERNATE EXHAUST DISCHARGE

[75] Inventor: Francis E. Bertram, Malone, Wis.

[73] Assignee: Brunswick Corporation, Skokie, Ill.

[21] Appl. No.: 322,544

[22] Filed: Mar. 13, 1989

[51] Int. Cl.⁴ ............................................. F02B 27/02
[52] U.S. Cl. ...................................... 60/313; 440/89
[58] Field of Search ...................... 60/313, 312, 288; 440/89

[56] References Cited

U.S. PATENT DOCUMENTS

| | | |
|---|---|---|
| 3,788,284 | 1/1974 | Gardner ............................ 60/288 |
| 3,796,546 | 3/1974 | Poullot ............................. 60/288 |
| 3,813,880 | 6/1974 | Reid et al. . | 
| 3,908,366 | 9/1975 | Masaki ............................. 60/288 |
| 3,943,710 | 3/1976 | Lange .............................. 60/288 |
| 4,287,716 | 9/1981 | Schuster .......................... 60/288 |
| 4,484,442 | 11/1984 | Hale . |
| 4,668,199 | 5/1987 | Freund et al. . |
| 4,766,854 | 8/1988 | Riese . |
| 4,773,215 | 9/1988 | Winberg et al. . |

Primary Examiner—Douglas Hart
Attorney, Agent, or Firm—Andrus, Sceales, Starke & Sawall

[57] ABSTRACT

An internal combustion engine is provided with an exhaust discharge system providing merging exhaust paths for discharging exhaust from individual cylinders into an exhaust cavity. A diverter valve is provided for selectively preventing merger of the exhaust from the individual cylinders prior to discharge, and an exhaust passage receives such diverted exhaust for discharge into the exhaust cavity. The diverter valve operates to divert exhaust at low speed operation, which provides satisfactory low speed exhaust tuning. The diverter valve is closed at high speed operation to allow the exhaust from the individual cylinders to merge prior to discharge, which provides satisfactory high speed exhaust tuning. The invention provides satisfactory exhaust tuning at both high speed and low speed operation, which heretofore had not been possible, to increase overall engine performance and power.

10 Claims, 2 Drawing Sheets

MARINE ENGINE EXHAUST SYSTEM WITH DIVERTER VALVE AND ALTERNATE EXHAUST DISCHARGE

BACKGROUND AND SUMMARY

This invention relates to a marine engine exhaust system.

It is common to employ a vertical drive shaft in-line two-stroke cycle engine in the power head of an outboard marine propulsion system. With this type of engine, it is known to provide an exhaust flow path in which exhaust from the upper cylinders is collected and routed through an exhaust passage to a substantially vertical branch. Exhaust from the lower cylinders is collected and routed in a similar manner to a substantially vertical branch, which is in line with the branch from the upper cylinders and which receives exhaust therefrom. The lower branch thus forms a common exhaust passage which receives exhaust from all cylinders, which exhaust is then routed downwardly into an exhaust collection cavity provided in the upper end of the drive shaft housing.

By design, this arrangement provides effective exhaust tuning at high engine speeds to increase horsepower. However, operation at low speed is not satisfactory because certain exhaust ports effectively are supplied with a negative pulse, which detracts greatly from performance under low speed and idle conditions. Most notably, this design provides a rough idle and a decrease in low-end horsepower.

One solution to this problem has been to cut off the supply of fuel to certain cylinders at low engine speed. In a four cylinder engine, for example, the number three and four cylinders continue to receive fuel, while the fuel supply to the number one and two cylinders is cut off. This eliminates negative pulses at the exhaust ports of the number three and four cylinders, which provides smoother idle operation. The result, of course, is a substantial decrease in available horsepower at low speed operation.

It is an object of the present invention to solve the above problems, and to provide an engine having satisfactory operation at both high and low engine speeds by providing proper exhaust tuning. The invention is utilized in connection with an internal combustion engine including two or more cylinders, first and second exhaust passages and an exhaust discharge. Each exhaust passage receives exhaust from at least one of the cylinders, and the exhaust passages are arranged so as to be in communication with each other. In accordance with the invention, the improvement to such a structure comprises a third exhaust passage having an inlet in communication with one of the first or second exhaust passages, and valve means actuable between an open position and a closed position for selectively controlling the flow of exhaust through the third exhaust passage. The valve means in its open position allows flow of exhaust through the third exhaust passage and cuts off exhaust flow through the second passage. In its closed position, the valve means allows no flow of exhaust through the third passage and restores communication between the first and second passages, so that exhaust flowing through the first passage merges with exhaust flowing through the second passage prior to discharge. The third passage preferably has an outlet in communication with the exhaust discharge. The valve means is preferably disposed at or adjacent to the inlet to the third exhaust passage, and when open directs substantially all exhaust upstream thereof into the third passage and cuts off flow of such exhaust into the downstream passage. Actuator means is provided for moving the valve means between its open and closed positions. In one embodiment, the actuator means comprises a solenoid having a retractable and extendable plunger, which is operatively connected to a valve actuating arm for moving the valve between its open and closed positions. The solenoid is preferably interconnected with means outputting a signal proportional to engine speed. In this manner, the valve is opened at low engine speeds to provide proper exhaust tuning and improved operation of the engine, and closed at higher rpms.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
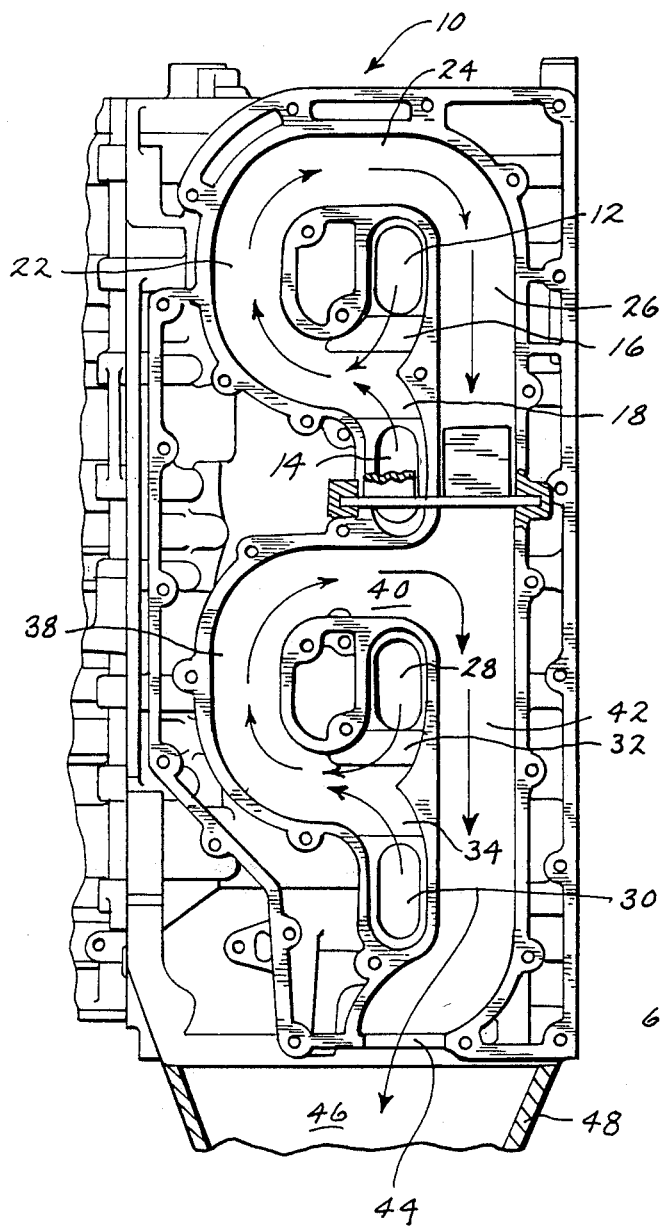
FIG. 1 is an elevation view of a four cylinder two-stroke cycle outboard marine engine with its outer cover plate assembly removed, showing the exhaust path thereof and the diverter valve of the invention disposed therein.

FIG. 1 partially illustrates the block, shown at 10, of a vertical drive shaft two-stroke cycle four cylinder internal combustion engine. As shown in FIG. 1, a cover assembly is removed so as to expose the exhaust discharge system of the engine.

A pair of upper exhaust ports 12, 14, are formed in block 10 to receive exhaust gases from a pair of upper cylinders, as is known. A branch passage 16 routes exhaust from port 12, and a branch passage 18 routes exhaust from port 14. Branch passages 16 and 18 merge into an exhaust passage which includes a substantially vertical portion 22 and a horizontal portion 24, which routes exhaust to an upper vertical passage 26 to direct the exhaust downwardly.

In a similar manner, block 10 includes a pair of lower exhaust ports 28, 30 in communication with a pair of lower cylinders. Branch passages 32, 34 merge into a passage including a vertical portion 38 and a horizontal portion 40, which leads to a lower vertical passage 42 for discharging exhaust downwardly. As shown, upper vertical passage 26 and lower vertical passage 42 are in communication with each other.

Exhaust passing through passage 42 is discharged through an exhaust discharge outlet 44 into a cavity 46 formed in the upper portion of a drive shaft housing 48. As is known, the resonation of exhaust pulses within cavity 46 provides exhaust tuning to the engine by assisting in scavenging exhaust gases from the cylinders. This type of system is described and discussed in detail in Hale U.S. Pat. No. 4,484,442, hereby incorporated by reference.

The exhaust discharge construction as described above is generally designed to provide satisfactory exhaust tuning at high speed operation. However, it has been found that, at low speed operation, this construction does not provide satisfactory exhaust tuning, resulting in rough operation during idle and inadequate acceleration at low speeds.

Figure 2:
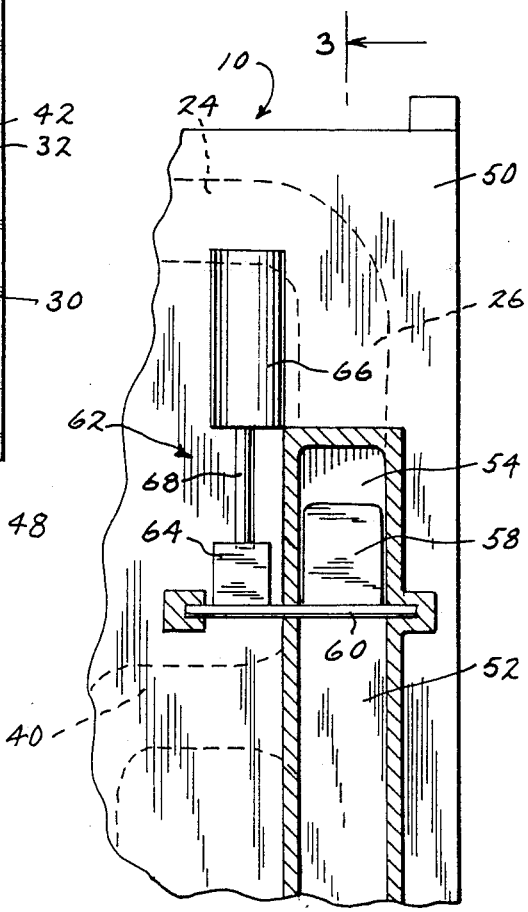
FIG. 2 is a partial elevation view somewhat similar to FIG. 1, showing a portion of the engine of FIG. 1 with its outer cover plate assembly in place and showing the third exhaust passage in section.

With reference to FIG. 2, a cover assembly 50 is shown in place on block 10. Cover assembly 50 includes an exhaust passage 52 for providing an alternate route of discharge of exhaust from upper vertical exhaust passage 26. An inlet 54 is formed in cover assembly 50 for providing communication between exhaust passage 52 and upper vertical exhaust passage 26. This construction is clearly illustrated in FIGS. 3 and 4. Exhaust passage 52 is oriented so as to extend along a longitudinal axis substantially parallel to that of lower vertical exhaust passage 42. Exhaust passage 52 is provided with an outlet 56 for discharging exhaust flowing therethrough into cavity 46 of drive shaft housing 48.

A valve mechanism is provided for selectively controlling passage of exhaust into exhaust passage 52. The valve mechanism includes a valve flap 58 mounted to a pivotable rod 60. As best shown in FIGS. 1 and 2, rod 60 is pivotably mounted at its ends so as to extend through upper vertical exhaust passage 26 and leftwardly therefrom. Flap 58 is disposed adjacent inlet 54 to passage 52, and adjacent upper vertical passage 26.

Figure 3:
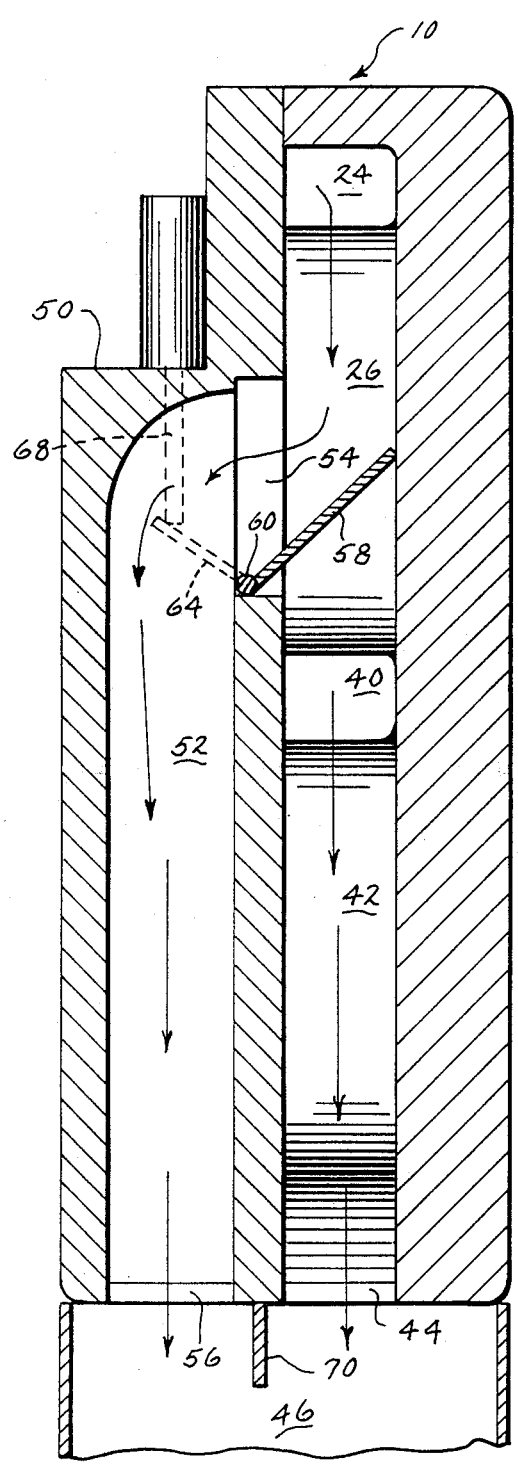
FIG. 3 is a sectional view taken generally along line 3—3 of FIG. 2, with the diverter valve of the invention in its open position.
Figure 4:
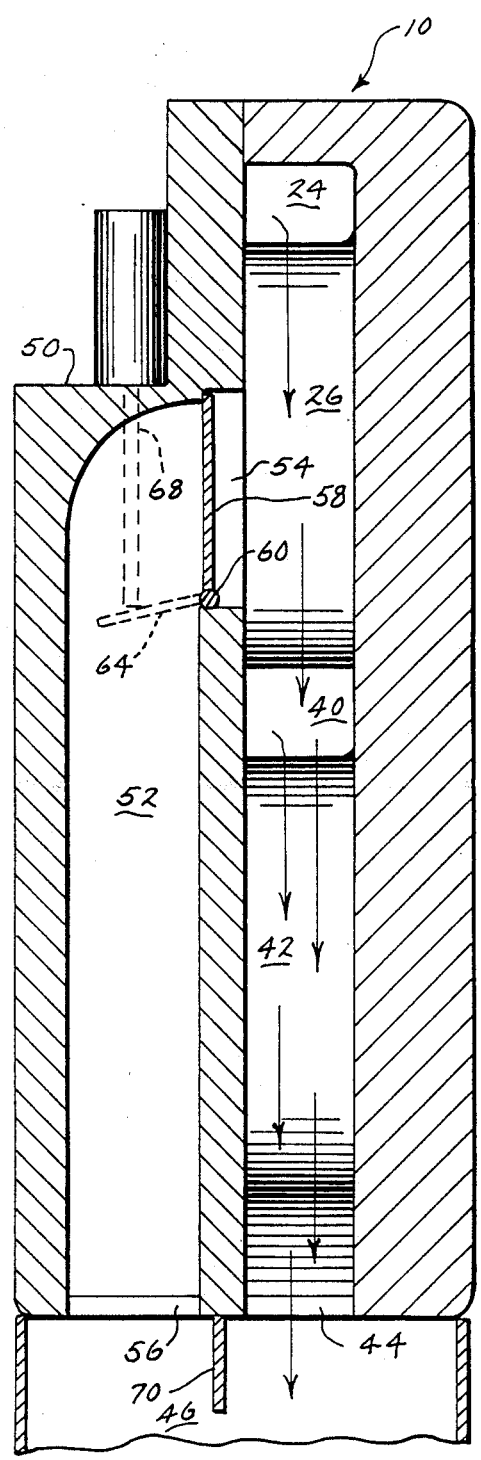
FIG. 4 is a view similar to FIG. 3, showing the diverter valve of the invention in its closed position.

Flap 58 is movable between an open position, as shown in FIG. 3, and a closed position as shown in FIG. 4. In its open position, flap 58 directs exhaust from upper vertical exhaust passage 26 into exhaust passage 52, cutting off the flow of exhaust from upper vertical exhaust passage 26 into lower vertical exhaust passage 42. In this manner, all exhaust from the upper two cylinders is routed from upper vertical exhaust passage 26 into exhaust passage 52 through inlet 54. When flap 58 is in its closed position, all flow of exhaust through inlet 54 into passage 52 is prevented, allowing exhaust flowing through upper vertical exhaust passage 26 to merge with exhaust flowing through lower horizontal exhaust passage 40 for discharge through lower vertical exhaust passage 42.

An actuator mechanism, shown generally at 62, is provided for controlling the position of flap 58. Actuator mechanism 62 includes an actuator arm 64 mounted to pivotable rod 60, and a solenoid 66 including an extendable and retractable plunger 68 which acts on actuator arm 64. When solenoid plunger 68 is in its retracted position, as shown in FIG. 3, flap 58 is in its open position for routing exhaust into passage 52. A torsion spring or other such biasing means may be associated with pivotable rod 60 for biasing flap 58 toward its open position. When solenoid plunger 68 is in its extended position, as shown in FIG. 4, actuator arm 64 is forced downwardly so as to move flap 58 to its closed position, thus cutting off flow of exhaust into exhaust passage 52.

Solenoid 66 is mounted to the exterior of cover assembly 50, and is actuated in response to a signal indicative of engine speed. For example, solenoid 66 may satisfactorily be interconnected with a sensing device linked to the ignition system, which outputs a signal responsive to engine speed.

At low speed operation, solenoid plunger 68 is in its retracted position so as to allow flap 58 to attain its open position, thus routing exhaust into passage 52. With this operation, proper exhaust tuning at low speed is provided by preventing exhaust from the upper two cylinders from merging with exhaust from the lower two cylinders prior to discharge into exhaust cavity 46. This operation in effect provides two separate engines operating independently of each other, eliminating the effect of exhaust pulses from the upper cylinders on the lower cylinders, and vice versa. This results in smoother operation at idle, and increased horsepower at low engine speeds. At high speed operation, solenoid plunger 68 is extended so as to move flap 58 to its closed position. Exhaust from the upper two cylinders is then merged with exhaust from the lower two cylinders for discharge into exhaust cavity 46, providing satisfactory exhaust tuning at high speed operation.

A wall 70 formed in drive shaft housing cavity 46 separates exhaust outlets 44 and 56 and effectively extends the length of passages 42 and 52. It is to be appreciated that, when valve flap 58 is open so that exhaust passes through both passages 42 and 52, exhaust pulses from exhaust discharged from exhaust passage 52 must travel downwardly through drive shaft housing cavity 46 and then back upwardly before such pulses can have any possible effect on the lower cylinders. By this time, the strength of such pulses has been weakened sufficiently so as to have little, if any, effect on operation of the lower cylinders. The same holds true for any effect which exhaust discharged through passage 42 may have on operation of the upper cylinders.

While the invention has been described with reference to an in-line four cylinder vertical drive shaft two-stroke cycle engine, it is to be appreciated that the invention is not limited to such an application, and may be utilized in connection with any orientation of a two- or four-stroke cycle engine having any number of cylinders. For example, in a three cylinder two-stroke cycle engine with a vertical drive shaft, each of the upper two cylinders could be provided with its own diverter valve and its own separate exhaust passage, such as shown at 52, for providing an alternate discharge of exhaust from such cylinders at low engine speeds.

Various alternatives and modifications are contemplated as being within the scope of the following claims particularly pointing out and distinctly claiming the subject matter regarded as the invention.

I claim:

1. An internal combustion engine, comprising:

an engine block;

two or more cylinders disposed within said engine block;

a first internal exhaust passage in said engine block for receiving exhaust from one of said cylinders;

a second internal exhaust passage in said engine block for receiving exhaust from another of said cylinders;

said first and second exhaust passages being arranged so as to merge into a common exhaust discharge passage in said engine block for discharging exhaust therefrom;

a third internal exhaust passage in said engine block having an inlet in communication with one of said first and second exhaust passages upstream of the merger of said first and second exhaust passages into said common discharge passage; and valve means actuable between an open position and a closed position for selectively controlling the flow of exhaust through said third exhaust passage, said valve means in its open position allowing flow of exhaust through said third exhaust passage, and in its closed position cutting off exhaust flow through said third passage so that exhaust flowing through said first passage communicates with exhaust flowing through said second passage prior to discharge.

2. The engine according to claim 1, wherein said valve means is disposed at the inlet to said third passage for selectively opening and closing said inlet to selectively allow and cut off exhaust flow therethrough.

3. The engine according to claim 1, further comprising actuator means for moving said valve means between said open position and said closed position.

4. The engine according to claim 3, wherein said valve means comprises a flap mounted for pivoting movement between an open position and a closed position, and wherein said actuator means comprises extendable and retractable means operably connected to said valve means for pivoting said flap between its open and closed positions.

5. The engine according to claim 4, wherein said actuator means comprises a solenoid having an extendable and retractable plunger, said plunger being operably connected to said valve means for providing pivoting movement of said flap.

6. The engine according to claim 5, wherein said valve flap is mounted along an edge thereof to a pivotable member disposed adjacent said inlet to said third passage, and wherein said solenoid plunger acts on an actuator arm mounted to said pivotable member for moving said flap between its open and closed positions.

7. The engine according to claim 1, wherein said common exhaust discharge passage has an outlet discharging exhaust into an exhaust cavity, and wherein said third exhaust passage has an outlet opening into said exhaust cavity.

8. The engine according to claim 1, wherein positioning of said valve means to its open position substantially cuts off communication between said first and second exhaust passages for preventing exhaust flow therebetween and directing substantially all exhaust upstream of said valve means into said third exhaust passage.

9. The engine according to claim 1, wherein said third passage is disposed adjacent said common passage and is separated therefrom by a wall, with the inlet to said third passage being located upstream of said common passage.

10. The engine according to claim 1, wherein said third passage extends along an axis substantially parallel to the axis of said common passage.

* * * * *